(12) United States Patent
Rautio et al.

(10) Patent No.: US 6,975,740 B2
(45) Date of Patent: Dec. 13, 2005

(54) WATERPROOF ACOUSTIC STRUCTURE APPLICABLE IN CONJUNCTION WITH SPEAKER

(75) Inventors: Janne Rautio, Oulu (FI); Juha Petteri Jylänki, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/677,981

(22) Filed: Oct. 1, 2003

(65) Prior Publication Data

US 2004/0081325 A1    Apr. 29, 2004

(30) Foreign Application Priority Data

Oct. 24, 2002  (FI)  ................... 20021896

(51) Int. Cl.[7] ............................................. H04R 25/00
(52) U.S. Cl. ...................... 381/386; 381/189; 381/391
(58) Field of Search ................................. 381/344, 345, 381/350, 351, 386, 391, 189, 361, 355, 360, 381/423, 424; 181/149; 379/175, 430; 128/201.19

(56) References Cited

U.S. PATENT DOCUMENTS

2004/0037441 A1 * 2/2004 Konishi et al. ............. 381/190

FOREIGN PATENT DOCUMENTS

GB          2064265       * 10/1981

OTHER PUBLICATIONS

Patent Abstracts of Japan, JP2002271465, Hitachi Kokusai Electric, Inc., Sep. 2, 2002.
Patent Abstracts of Japan, JP11069472, Uniden Corp., Sep. 3, 1999.

* cited by examiner

*Primary Examiner*—Huyen Le
(74) *Attorney, Agent, or Firm*—Harrington & Smith, LLP

(57) ABSTRACT

The invention relates to an acoustic structure which complies with protection standard IP 67 and which can be used to provide hands-free capability e.g. in cellular terminals or small radio receivers. The acoustic structure comprises, in a device body (100), two interconnected, separate cavities for speaker means (151, 152, 153) and isolating means (120, 125, 130, 140). An isolating diaphragm (125) belonging to the speaker arrangement according to the invention is utilized simultaneously as an isolating means against dust and water and as a sound-reproduction element.

8 Claims, 5 Drawing Sheets

WATERPROOF ACOUSTIC STRUCTURE APPLICABLE IN CONJUNCTION WITH SPEAKER

FIELD OF THE INVENTION

The invention relates to an acoustic structure applicable in conjunction with a speaker, which structure is dustproof and waterproof according to the IP 67 class of protection of the IEC/EN 60529 standard of the International Electrotechnical Commission, and which comprises, in the body of a device two discrete, interconnected cavities for speaker means and isolating means. The invention also relates to a device employing the acoustic structure.

The International Electrotechnical Commission (IEC) is the authoritative worldwide body responsible for developing consensus global standards in the electrotechnical field. The IEC is dedicated to the harmonization and voluntary adoption of these standards, supporting the transfer of electrotechnology, assisting certification and promoting international trade.

Since 1906, the IEC hes served the world's electrical industry, developing international standards to promote quality, safety, performance, reproducibility, and environmental compatibility of materials, products, and systems. It has also published standards for the electronics and telecommunications industries. The IEC's present membership of 51 countries includes most major trading nations.

The IEC standards are widely adopted as the basis of national or regional electrotechnical standards, and are often quoted in manufacturer's specifications and by users when calling for tenders. Over 2000 standards cover virtually every topic of electrotechnology from acoustics, to medical devices, to insulating materials, to aircraft, to nuclear instruments.

BACKGROUND OF THE INVENTION

Cellular terminals can be used in many different environments. Increasingly, terminals will be used in environments where they are subject to moisture or fine dust. Therefore there are terminals on the market in which the cover parts constitute a dustproof and waterproof structure assembled of two separate components. The speaker element in the terminal resides within this waterproof structure.

In some respects such a structure is problematic. First, the audio level produced by the speaker element in this kind of an arrangement is so low that the user of the terminal has to place the terminal close to his ear. The terminal cannot be used hands free because the audio level is not sufficient for that kind of use.

Making the speaker element dustproof and waterproof means usually that a sealing diaphragm has to be placed in front of the speaker element, which diaphragm with its fastening structures will result in that the terminal must be designed and fabricated a few millimeters thicker so that said isolating diaphragm can be positioned at the right distance from the speaker element.

SUMMARY OF THE INVENTION

An object of the present invention is to provide a compact dustproof and waterproof speaker structure the acoustic pressure produced by which is so high that it makes possible to advantageously produce a hands-free-capable cellular terminal.

The objects of the invention are achieved by an arrangement in which a dustproof and waterproof isolating diaphragm is placed in a separate cavity laterally adjacent to the speaker element proper, into which cavity the acoustic pressure produced by the speaker element is directed. The isolating diaphragm isolates the speaker element in a dustproof and waterproof manner from space external to the terminal. At the same time the isolating diaphragm serves as a sound reproducing element and its dimensions have an effect on the acoustic pressure produced. The acoustic pressure produced by the arrangement according to the invention is sufficient to realize a hands-free-capable terminal.

An advantage of the invention is that it can be used to provide a hands-free-capable compact dustproof and waterproof speaker structure in portable devices, for example.

Another advantage of the invention is that the acoustic pressure produced by means of the invention outside the device is higher than that produced by solutions according to the prior art.

A further advantage of the invention is that by placing the isolating diaphragm, which functions as both an isolating means and sound-reproducing means, in a cavity according to the invention beside the speaker element, the dimensions of said isolating diaphragm can be chosen independent of the speaker element proper and, thus, the speaker structure can always be given dimensions which produce the desired acoustic characteristics.

A still further advantage of the invention is that using adjacently placed cavities it is possible to freely choose the location of the outgoing sound path on a side or end of the device, for example.

A still further advantage of the invention is that the dimensions of the cavity for the speaker element proper can also be chosen freely in order to meet the acoustic demands.

A still further advantage of the invention is that the terminal can be fabricated several millimeters thinner than what is possible using prior-art waterproof and dustproof speaker structures.

A speaker arrangement according to the invention is characterized in that an isolating diaphragm belonging to isolating means is adapted so as to serve simultaneously both as an isolating means for dust and water and as a sound-reproducing element.

Some preferred embodiments of the invention are specified in the dependent claims.

The basic idea of the invention is as follows: Speaker means of a terminal are located in a special cavity in the body of the terminal fabricated advantageously of plastic, which cavity hereinafter is called the first cavity, the dimensions of which are chosen in order to produce acoustic characteristics desired. An isolating diaphragm serving as a sealing element and protecting against dust and water is placed in a second cavity in the body of the terminal, which second cavity is a separate cavity located laterally beside the first cavity reserved for the speaker means. From the first cavity reserved for the speaker means an acoustic path leads to said second cavity in which the isolating diaphragm is placed. The isolating diaphragm advantageously divides the cavity into two sub-cavities separated from one another in a dustproof and waterproof manner. Of these sub-cavities a first one is in direct connection with a first acoustic path coming from the cavity reserved for the speaker means. Sound waves produced by the speaker element are conducted via this first acoustic path into the first sub-cavity. The sound waves produced by the speaker element also make the isolating diaphragm in the second cavity vibrate.

The movement of the isolating diaphragm results in pressure variation in the second sub-cavity from which there is arranged an open second acoustic path outside the terminal. This second acoustic path advantageously has dimensions such as to produce desired sound reproduction characteristics. Dust and water outside the terminal can only enter this second sub-cavity because the isolating diaphragm prevents them from entering the first sub-cavity and thereby also prevents them from getting into contact with the speaker means proper.

BRIEF DESCRIPTION OF THE DRAWINGS

The invention is below described in detail. The description makes reference to the accompanying drawings in which.

DETAILED DESCRIPTION OF THE INVENTION

The dustproof and waterproof acoustic structure/speaker arrangement according to the invention is below described using mainly examples relating to an exemplary cellular network terminal. It is obvious to a person skilled in the art that the acoustic structure/speaker arrangement according to the invention can also be utilized in other devices requiring sound reproduction, which devices may be either fixed or mobile. Examples of such devices include robot phones, direct-call intercom phones, small portable audio devices and radio receivers. What is essential in the invention is that it can be used to isolate a speaker element in a device from the external environment in a dustproof and waterproof manner. The device can advantageously be used as a hands-free-capable device. This means that the audio level produced by the device is high enough so that a message or signal reproduced by the device is understandable also when the device is not held in the vicinity of the user's ear. The protection standard met using the arrangement according to the invention is IP 67.

Figure 1:
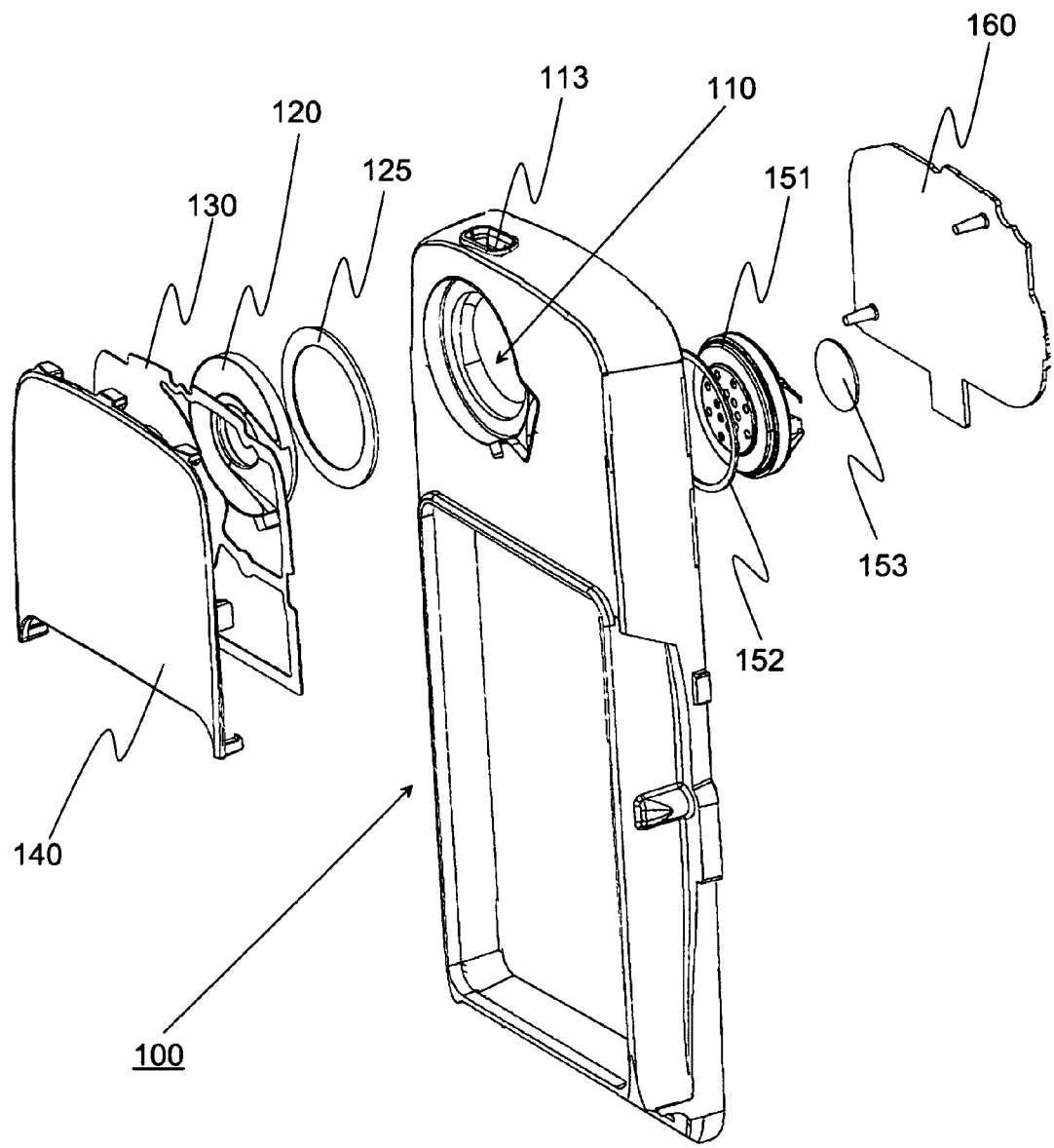
FIG. 1 shows, as an example, a device in which the dustproof and waterproof acoustic structure according to the invention is used.

FIG. 1 shows, as an example, the utilization of the acoustic structure according to the invention in the speaker arrangement of a cellular terminal. The protection against dust and water of other parts of the terminal, such as keypad and display unit, can be advantageously arranged using other known solutions. FIG. 1 only shows elements belonging to the speaker arrangement according to the invention.

In FIG. 1, reference designator 100 represents the body of a terminal seen from the rear side. The body is advantageously fabricated by means of extrusion, using a suitable plastic material. The electrical and mechanical components of the terminal are attached to the body 100 thereby producing a functioning terminal. As viewed from the direction shown in FIG. 1, there is in the body 100 a substantially circular cylindrical cavity 110, hereinafter called the second cavity, where the isolating means belonging to the arrangement according to the invention, i.e. the isolating diaphragm 125 and the attachment disc 120 which advantageously accompanies said isolating diaphragm, are inserted. The second cavity 110 is shaped such that the isolating diaphragm 125 and attachment disc 120 can be placed in this second cavity at the desired location. The second cavity 110 has a fixed bottom belonging to the body 100, which bottom is not shown in FIG. 1, because it is on the front side of the terminal, which front side is not visible in FIG. 1. In addition, FIG. 1 shows a cover part 140 which may comprise circuit arrangements relating to the terminal's antenna, for example. FIG. 1 also shows a sealing part 130. It seals up the cover part 140 and second cavity 110 in the body 100 of the terminal in a dustproof and waterproof manner. The sealing part 130 is advantageously made of some soft material with glue-like material on both surfaces thereof.

Reference designator 113 represents an audio path from the cavity 110, hereinafter called the second audio path, through which the sound waves produced by the speaker arrangement exit the terminal. The design of the second audio path 113 is such that its acoustic characteristics will not suppress the sound level obtained from the speaker arrangement according to the invention. Advantageously the second audio path 113 is constructed so as to open up at that end of the terminal where the speaker arrangement according to the invention is located. With a second audio path designed this way it is possible to get the sound obtained from the terminal to leave the terminal along the longitudinal axis thereof. A particularly advantageous effect on the audio level is achieved when the terminal utilizing the invention is placed on a sound reflecting surface which is horizontal enough. That surface can then be used to direct the sound waves coming from the second audio path 113 so that they are reflected from said surface towards the user of the terminal. With the speaker arrangement according to the invention it is possible to achieve an acoustic pressure of 100 dB at a distance of 5 cm from the device. Thus the speaker arrangement according to the invention can be used as a hands-free-capable device.

FIG. 1 further shows the speaker element 151 proper with other parts in connection therewith. The body 100 of the terminal has a substantially circular cylindrical cavity for the speaker means, which cavity is not visible in FIG. 1 and will be hereinafter called the first cavity. The speaker means advantageously comprise the speaker element 151 and other components associated therewith. The first cavity reserved for the speaker element 151 is located substantially in the same plane with the aforementioned second cavity 110, viewed laterally with respect to the device. With the speaker arrangement according to the invention there is no need to increase the thickness of the terminal because of the requirements concerning protection against dust and water. The speaker element 151 is inserted in the first cavity in such a manner that there remains between the sound-reproducing surface of the element and the bottom of the first cavity a free air space suitable for sound reproduction. Together with the speaker element 151, advantageously a sealing ring 152 and a damper 153 are also installed in the first cavity. The sealing ring 152 acoustically isolates the cavity in front of the speaker element 151 from the acoustically tuned air space behind the speaker element 151. With a sealing plate 160 it is possible to seal the air space behind the speaker element 151 from the rest of the inner volume of the terminal, enabling its acoustical tuning. The damper 153 helps keep the speaker element 151 in the correct position in the first cavity and at the same time serves as a mechanical damper. The sealing plate 160 also protects the speaker element 151 from mechanical damage.

Figure 2:
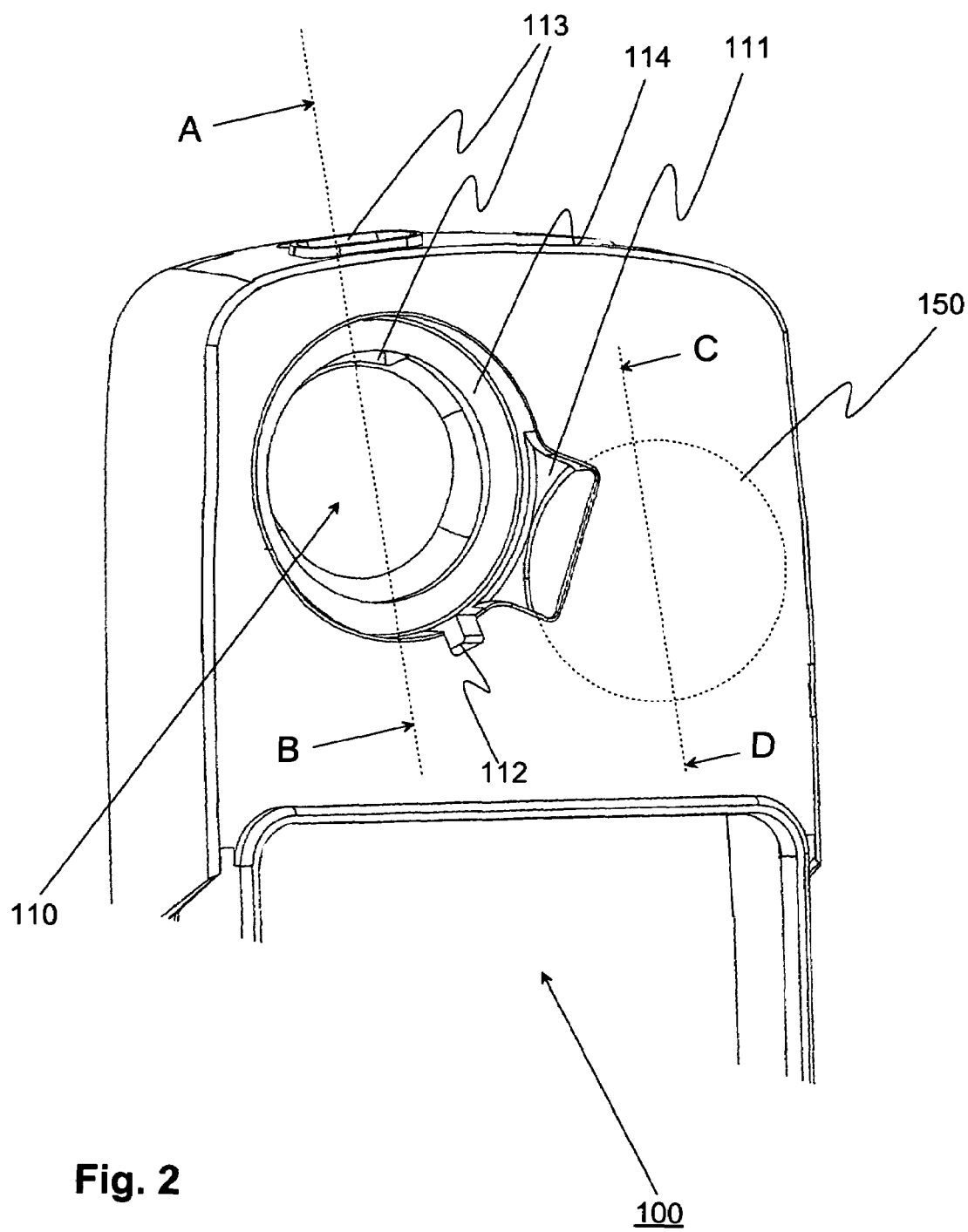
FIG. 2 shows, as an example, one possible placement in a device body of a speaker element and sealing means against dust and water in the arrangement according to the invention.

FIG. 2 shows in greater detail that end of the terminal body 100 depicted in FIG. 1 which houses the speaker arrangement according to the invention. Reference designator 110 represents a second cavity belonging to the arrangement. The broken lines of reference designator 150 represent a first cavity where speaker means proper are located. The opening of this first cavity 150 lies on the rear side of the terminal body 100 depicted in FIG. 2, which rear side is not visible in FIG. 2. From the first cavity 150, from the free air space formed between the bottom thereof and the sound-reproducing surface of the speaker element 151, there leads an open first acoustic path 111 into the second cavity, above a substantially circular shoulder 114 therein. Below said shoulder 114 there leads a second acoustic path 113 out of the terminal. It is via this second acoustic path 113 that sound waves originally produced by the speaker element 151 are conducted outside the terminal. The second cavity 110 further includes an alignment hollow 112. Advantageously it can be used to assist in the correct positioning of the attachment disc 120 according to the invention in the second cavity 110.

From the point of view of the inventional idea it is significant that the openings of the second cavity and first cavity 150 in the terminal body 100 are located on different sides of the terminal body 100. This way the structure according to the invention makes it easier to acoustically isolate the rear air space and front air space in the speaker element. Now each cavity can have individual dimensions according to desired audio characteristics and/or sealing requirements. The proportions of the cavities shown in FIG. 2 are only intended to illustrate the mutual positions of said cavities in an exemplary manner. In principle, the cavities may have openings on the same side of the body, in which case it is easier to produce a watertight structure as there is no need for the sealing function of the cover part 140, but acoustically, such a structure is more difficult to realize than the other alternative described above.

Figure 4:
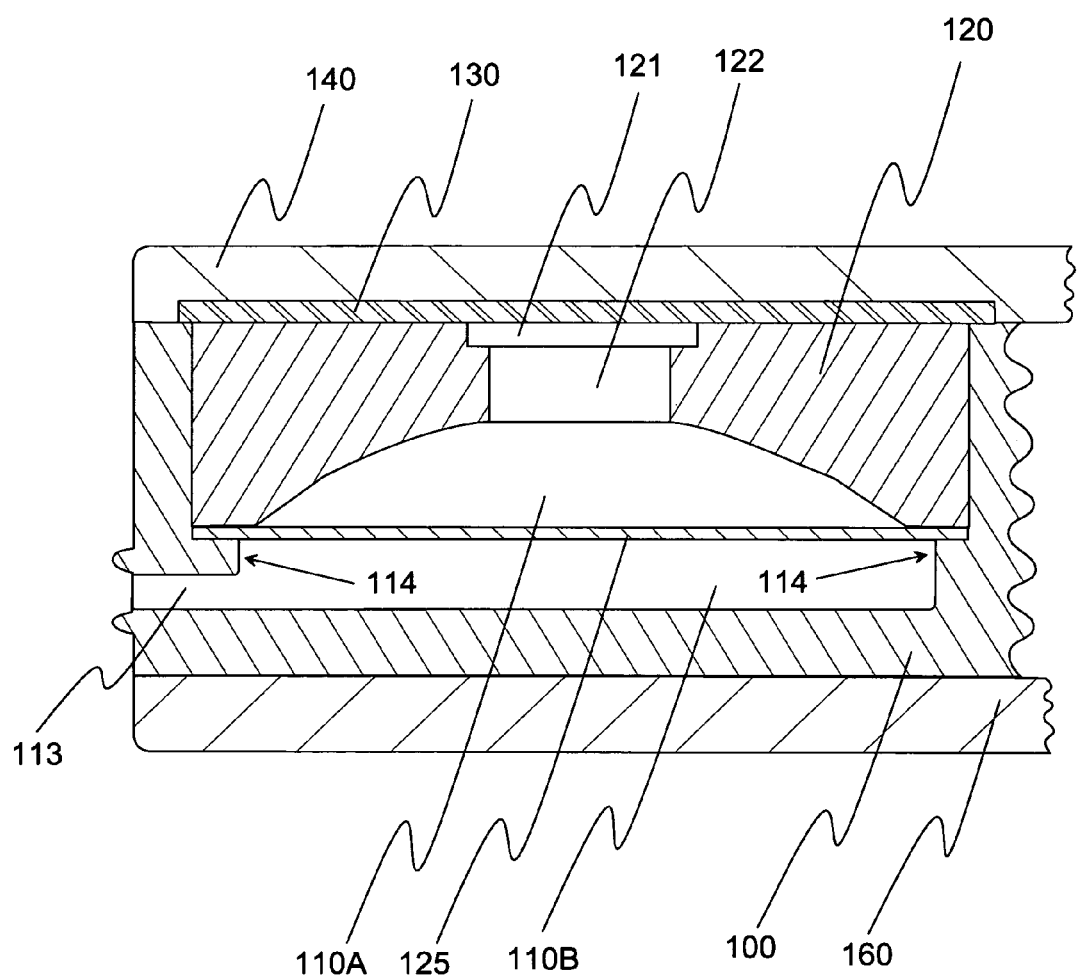
FIG. 4 shows, as an example, section A–B of the device body of FIG. 2, viewed laterally with respect to the body at the second cavity.
Figure 5:
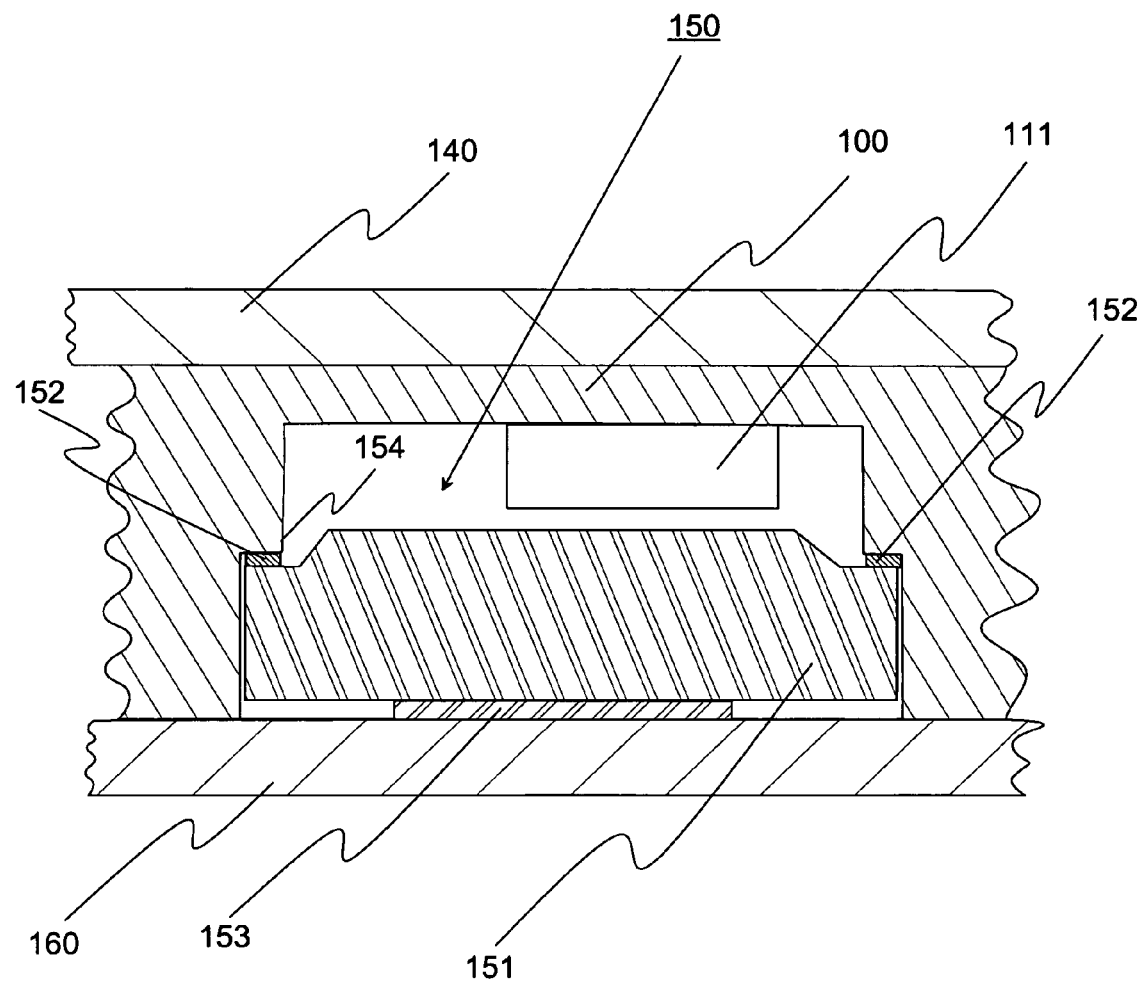
FIG. 5 shows, as an example, section C–D of the device body of FIG. 2, viewed laterally with respect to the body at the first cavity.

Lateral sections A–B and C–D in FIG. 2 are described more closely in conjunction with the descriptions of FIGS. 4 and 5.

Figure 3A:
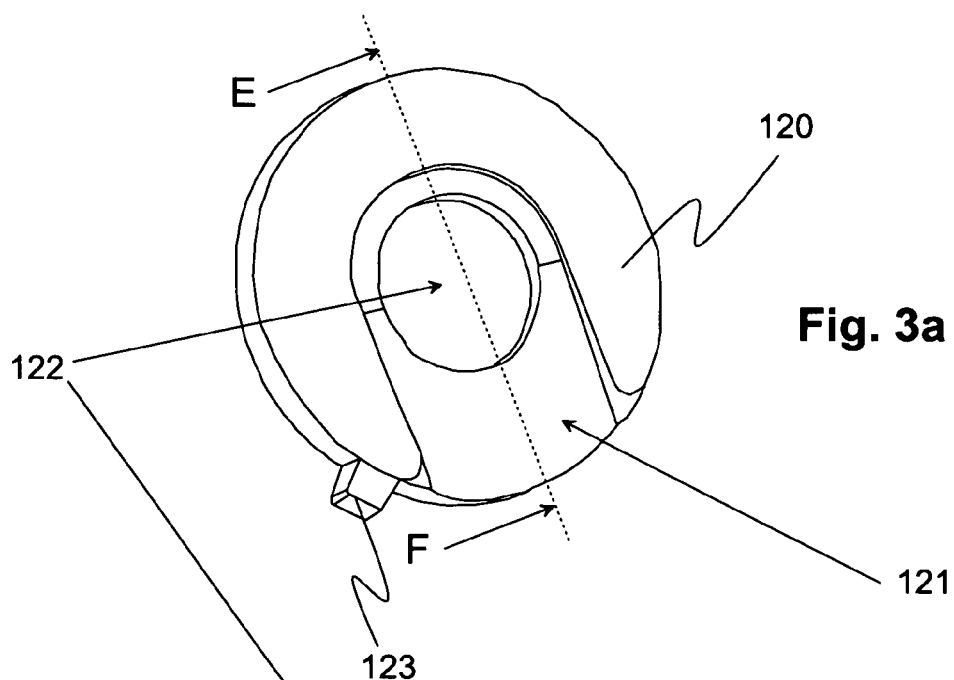
FIG. 3a shows an attachment disc for an isolating diaphragm belonging to the arrangement according to the invention.
Figure 3B:
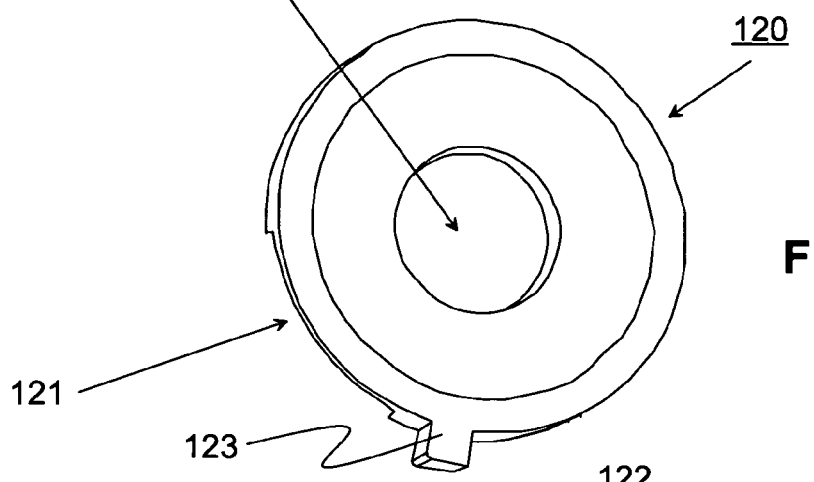
FIG. 3b shows the attachment disc of FIG. 3a seen from the other side.
Figure 3C:
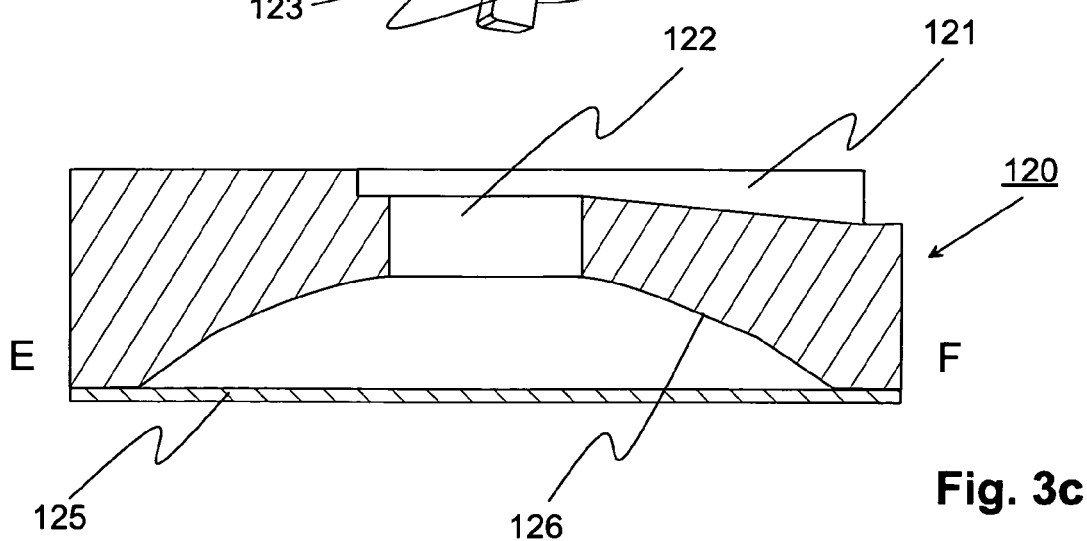
FIG. 3c shows, as an example, the attachment disc for the isolating diaphragm, marked in FIG. 3a, with attached isolating diaphragm in section E–F.

FIGS. 3a, 3b and 3c give a more detailed picture of the attachment disc 120 according to the invention. An attachment disc 120 is advantageous for two reasons. First, the diaphragm 125 for the protection against dust and water can advantageously be attached to the attachment disc 120 when the isolating diaphragm 125 is fastened to the shoulder 114 in the second cavity 110. The isolating diaphragm 125 can be attached to the shoulder 114 by means of glue, for example.

There is also another way of employing the attachment disc 120 in the speaker arrangement according to the invention. The attachment disc 120 is shaped such that there is a substantially circular aperture 122 in the center of it. The size and position of the aperture 122 are chosen such as to conduct the pressure variations caused by the sound coming from the first acoustic path 111 towards the isolating diaphragm 125. Direction of the pressure variations into the aperture 122 is emphasized by forming an audio channel 121 on the upper surface of the attachment disc 120, which here refers to the surface closer to the sealing part 130 in an assembled structure, which audio channel leads from the first acoustic path 111 around the aperture 122. Correct positioning of the audio channel 121 is ensured by means of a lug 123 which, in conjunction with the installation of the attachment disc 120, fits into an alignment hollow 112 in the terminal body 100.

FIG. 3c gives a sectional view of the section E–F of FIG. 3a. Here it is seen that the lower surface 126 of the attachment disc 120 is concave around the aperture 122. The isolating diaphragm 125 is advantageously glued to the outer rim of the lower surface 126 of the attachment disc 120. Advantageously there is glue on the edge of the isolating diaphragm 125 at least on that surface which faces the attachment disc 120. As the attachment disc 120 is pressed tight against the glued surface of the isolating diaphragm 125, it helps keep the diaphragm in place when there is water pressure directed to the surface of the isolating diaphragm 125. Moreover, the glued surface makes assembly easier in addition to serving as an acoustic sealant. Advantageously there is glue also on the other side of the isolating diaphragm 125, so that the construction is watertight as the isolating diaphragm 125 is attached to the shoulder 114. By means of the cover plate 140 the attachment disc 120 is pressed tight against the shoulder 114. This arrangement ensures a watertight construction in a situation where water pressure is directed to the isolating diaphragm 125 from the side of the second sub-cavity 110B.

Attached this way, the isolating diaphragm 125 is free to vibrate in either direction from the rest position shown in FIG. 3c. Thus, said isolating diaphragm 125 can at the same time function as an isolating means, to prevent dust and water from propagating towards the speaker element 151, and as a sound-reproduction means, as it vibrates in synchronism with the sound waves coming from the speaker element 151 via the audio channel 121 and aperture 122.

FIG. 4 shows, as an example, how the attachment disc 120 with isolating diaphragm 125 is placed within the terminal body 100. The attachment disc 120 is inserted in the substantially circular second cavity 110 in the body 100. The isolating diaphragm 125 is advantageously already attached onto the lower surface 126 of the attachment disc 120. The attachment disc 120 and isolating diaphragm 125 are attached by means of glue, for example, to the shoulder 114 encircling the second cavity 110. Installed this way, the attachment disc 120 and isolating diaphragm 125 form a dustproof and waterproof isolating means in the second cavity 110. Moreover, the second cavity is this way divided into two sub-cavities by the isolating diaphragm 125. The first sub-cavity 110A is connected to the first cavity reserved for the installation of the speaker element 151 proper via the audio channel 121 and first acoustic path 111. From the second sub-cavity 110B there leads a free second acoustic path 113 out of the terminal.

The isolating diaphragm 125 also functions as an acoustic element in the terminal according to the invention. Because of the design of the lower surface 126 of the attachment disc 120, the isolating diaphragm 125 can vibrate freely around its rest position. The size and shape of the first sub-cavity 110A and second sub-cavity 110B have effect on the audio level and frequency band obtained from the terminal via the second acoustic path 113.

FIG. 4 further shows the sealing part 130 which seals up the attachment disc 120 at the upper side thereof. Outer shell components of the terminal comprise the cover part 140, supporting the sealing part 130, and the sealing plate 160 which closes up the air space behind the speaker element 151. Assembled together, these components belonging to a speaker arrangement in a terminal constitute a dustproof and waterproof structure in which dust and water cannot propagate past the second sub-cavity 110B.

FIG. 5 shows, as an example, how in an arrangement according to the invention the speaker element 151 is placed in the first cavity 150 in the body 100 of a terminal, which first cavity advantageously has a basic structure of a circular cylinder. Prior to installing the speaker element 151 in the first cavity 150, a sealing ring 152 is placed there, against a substantially circular shoulder 154 in the first cavity 150. Next, the speaker element 151 is placed against the sealing ring 152. The position of the shoulder 154 determines the volume of free air space at the upper part of the first cavity between the speaker element 151 and terminal body 100. Thus the free air space can have dimensions suitable for the desired acoustic characteristics. Under the speaker element 151 there is placed a damper 153 made advantageously of a flexible material which lies between the speaker element 151 and the sealing plate 160. The material and thickness of the damper 153 can advantageously have damping effect on the mechanical vibrations of the speaker arrangement according to the invention.

The cavity 150 has such dimensions that there remains free air space at the upper part thereof when the speaker element 151 has been installed, the shape and size of which free air space are acoustically as desired. A first acoustic path 111 opens from this free air space towards the second cavity 110. Sound waves produced by the speaker element 151 are conducted via this acoustic path 111 into the second cavity 110 where they are directed towards the isolating diaphragm 125. The isolating diaphragm has such dimensions that it produces a desired audio level on the second acoustic path 113 through which the sound waves are released outside the terminal.

FIG. 5 further shows the cover part 140 utilized in the sealing-up of the second cavity 110.

FIGS. 1 to 5 only depict principal components of the arrangement according to the invention. So, a device employing the speaker arrangement according to the invention may naturally include other parts and components not shown in the Figures. The Figures are only intended to illustrate the components essential from the point of view of the invention, which parts and components can be used to produce the IP-67-class protection against dust and water and simultaneous hands-free speakerphone function according to the invention.

The speaker arrangement according to the invention can be advantageously applied in conjunction with various cellular terminals and other portable devices. The arrangement according to the invention has no effect on other mechanical or electrical components of the terminal than the speaker arrangement described above. An electrical signal can be brought to the connectors of the speaker element proper using any prior-art technique.

Embodiments of the invention were described above. The invention is not limited to the embodiments just described. For example, the basic shape of the first and second cavity may be something else than the circular shape here described. From the standpoint of the invention it is essential that said cavities can be located in the terminal body structure in an adjacent manner so that there is no need to increase the thickness of the terminal. The inventional idea can be applied in numerous ways within the scope defined by the claims.

What is claimed is:

1. An acoustic structure capable of hands-free speaker function and protected against dust and water comprising, in a device body, two interconnected, separate cavities for a speaker, and an isolator, where an isolating diaphragm, belonging to the isolator, is arranged to simultaneously function as an isolator for dust and water and as a sound-reproduction element, wherein on top of the isolating diaphragm on a shoulder in a second sub-cavity there is additionally placed a substantially circular attachment disc which has an aperture in it to direct a sound wave produced by the speaker and conducted via a first acoustic path into the second sub-cavity and there in a first sub-cavity, towards the isolating diaphragm.

2. The acoustic structure according to claim 1 wherein at least the perimeter area of that surface of the isolating diaphragm which faces the attachment disc is treated with glue in order to attach the isolating diaphragm to the attachment disc in a waterproof manner.

3. The acoustic structure according to claim 2 wherein at least the perimeter area of the other surface of the isolating diaphragm is also treated with glue in order to attach the isolating diaphragm to the shoulder in a waterproof manner.

4. The acoustic structure according to claim 1 wherein on that side of said attachment disc, which is not facing the isolating diaphragm, an audio channel is provided the width of which substantially at least equals the diameter of the aperture in the attachment disc, and which audio channel extends at least to said aperture.

5. The acoustic structure according to claim 4 wherein the attachment disc further comprises a lug arranged so as to be inserted in an alignment hollow in a second cavity in order to make the audio channel substantially parallel to the first acoustic path.

6. The acoustic structure according to claim 5 which further comprises a sealing part against the device body and attachment disc, and a cover part against said sealing part, which are arranged so as to press the isolating diaphragm, supported on the attachment disc, against the shoulder in order to close up the second sub-cavity in a dustproof and waterproof manner.

7. The acoustic structure according to claim 4 wherein the side of said attachment disc facing the isolating diaphragm is made concave to enable the isolating diaphragm to move in both directions about its rest position, and which movement is arranged so as to occur in accordance with the variations of acoustic pressure coming from the speaker into the first sub-cavity.

8. The acoustic structure according to claim 7 wherein the movement of the isolating diaphragm is arranged so as to cause variation of acoustic pressure in the second sub-cavity from where said variations of acoustic pressure are arranged to be conducted outside the device body via a second acoustic path.

* * * * *